United States Patent
Yang

Patent Number: 5,825,391
Date of Patent: Oct. 20, 1998

[54] METHOD FOR FORMING IMAGES USING A JET INK WHICH IS RUB RESISTANT TO ALCOHOL

[75] Inventor: Edward Yang, Inverness, Ill.

[73] Assignee: Videojet Systems International, Inc., Wood Dale, Ill.

[21] Appl. No.: 690,697

[22] Filed: Jul. 31, 1996

Related U.S. Application Data

[62] Division of Ser. No. 398,095, Mar. 3, 1995, Pat. No. 5,594,044.

[51] Int. Cl.⁶ .............................. G01D 11/00; B41J 2/01; B41J 3/407
[52] U.S. Cl. ........................... 347/106; 347/100; 347/105
[58] Field of Search ..................................... 347/100, 105, 347/106

[56] References Cited

U.S. PATENT DOCUMENTS

| 4,207,577 | 6/1980 | Mansukhani | 347/100 |
| 4,659,387 | 4/1987 | Luhmann et al. | 106/195 |
| 4,659,848 | 4/1987 | Kay et al. | 556/24 |

*Primary Examiner*—Patrick D. Niland
*Attorney, Agent, or Firm*—Leydig, Voit & Mayer

[57] ABSTRACT

Disclosed are a jet ink composition and a method for printing on glass, plastic, and metal surfaces messages having good adhesion and alcohol rub resistance, said composition comprising an organic solvent, a flexible thermoplastic urethane resin, a colorant, a cellulose nitrate resin, and an adhesion promoter.

20 Claims, No Drawings

METHOD FOR FORMING IMAGES USING A JET INK WHICH IS RUB RESISTANT TO ALCOHOL

This is a divisional of U.S. Pat. application Ser. No. 08/398,095, filed Mar. 3, 1995 now U.S. Pat. No. 5,594,044.

TECHNICAL FIELD OF THE INVENTION

The present invention relates to ink jet printing compositions for printing on non-porous substrates, particularly for printing on non-porous substrates such as metal, glass, and plastic containers, the jet printing composition having the characteristics of fast drying, good adhesion, and resistance to isopropyl alcohol rubs.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed image on that surface. This technique of noncontact printing is particularly well suited for application of characters onto irregularly shaped surfaces, including, for example, the bottom of glass, metal, or plastic containers, used for holding cosmetic, pharmaceutical, liquor, and health care products.

Reviews of various aspects of ink jet printing can be found these publications: Kuhn et al., *Scientific American*, April, 1979, 162–178; and Keeling, *Phys. Technol.*, 12(5), 196–303 (1981). Various ink jet apparatuses are described in the following U.S. Pat. Nos.: 3,060,429, 3,298,030, 3,373,437, 3,416,153, and 3,673,601.

In general, an ink jet composition must meet certain rigid requirements to be useful in ink jet printing operations. These relate to viscosity, resistivity, solubility, compatibility of components and wettability of the substrate. Further, the ink must be quick-drying and smear resistant, resist alcohol rubs, and be capable of passing through the ink jet nozzle without clogging, and permit rapid cleanup of the machine components with minimum effort.

Many of the surfaces on which ink jet printing is utilized are non-porous. The ink used for these applications must adhere well to the non-porous substrate and normally must be alcohol rub resistant. Many of the cosmetic, pharmaceutical, liquor, and health care products contain alcohols, such as isopropyl alcohol. During the manufacture and transportation of the products containing alcohol, there exists a possibility that the products may spill out of the containers and smear the printing codes.

Several ink compositions known heretofore are not suitable for the above use. For example, UK Patent Application GB 2,105,735 discloses a jet ink composition comprising an oil soluble dye-impregnated polyurethane latex dispersed in an aqueous medium.

U.S. Pat. No. 4,680,332 discloses a jet ink composition comprising a water insoluble polymer such as a polyacrylate dispersed in a liquid medium, the polymer containing therein an oil soluble dye, and a nonionic stabilizer permanently attached thereto.

U.S. Pat. No. 5,207,825 discloses a jet ink composition which comprises an aqueous liquid vehicle, a colorant, and a polymeric additive which is a substituted bisphenol A derivative.

U.S. Pat. No. 5,080,716 discloses a jet ink composition comprising a recording agent, a liquid medium capable of dissolving or dispersing the recording agent, and a substituted benzene or toluene sulfonamide compound.

U.S. Pat. No. 5,254,158 discloses an ink composition which comprises an aqueous liquid vehicle, a colorant, and an additive selected from the group consisting of amine alkoxylates, sorbitan monoester alkoxylates, alkylene oxide adducts of glycerin, and mixtures thereof.

U.S. Pat. Nos. 5,215,577 and 5,178,671 disclose jet ink compositions comprising a recording agent and a liquid medium for dissolution or dispersion thereof, the recording agent being an aromatic sulfonated diazo compound.

U.S. Pat. No. 5,131,949 discloses a jet ink composition including a recording agent, a liquid medium capable of dissolving or dispersing the recording agent, and a compound having an amide group.

U.S. Pat. No. 5,213,613 discloses a jet ink comprising a recording agent and a liquid medium capable of dissolving or dispersing the recording agent therein, wherein the ink contains an imide compound and at least one compound selected from the group consisting of urea, thiourea and derivatives thereof, and volatile alkaline compounds.

U.S. Pat. No. 4,692,188 discloses a process for the preparation of jet ink compositions, comprising (1) dissolving in a water-immiscible organic solvent a polymer composition and an organic oil soluble dye; (2) adding an aqueous phase water surfactant mixture thereto; (3) affecting emulsification thereof; and (4) subsequently evaporating from the aforementioned mixture the solvent thereby resulting in an ink with the dye trapped in the polymer particles suspended in the aqueous phase. The polymer compositions include polycarbonates, polystyrene, polymethacrylates and copolymers thereof.

U.S. Pat. application No. 08/121,296, filed Sep. 14, 1994, and assigned to the same entity as the instant application, discloses an ink composition for use in drop-on-demand ink jet operations for printing on porous substrates such as paper and card board, which has low levels of volatile organic compounds and that is both non-teratogenic and non-carcinogenic.

All of the water based jet ink compositions disclosed by the above references are generally directed to ink compositions suitable for printing on paper and are not considered suitable for printing on the containers which are non-porous. To obtain the necessary qualities of being fast drying and demonstrating good adhesion, solvent-based ink must be used. Therefore a need exists for a jet ink composition that is solvent-based, fast drying, and has good adhesion to non-porous containers and isopropyl alcohol rub resistance. The ink should be capable of being printed onto glass, plastic, and metal surfaces with good adhesion.

SUMMARY OF THE INVENTION

The present invention provides ink compositions that are capable of adhering on glass, plastic, and metal container surfaces used for the packaging of cosmetics, pharmaceuticals, liquor, and health care products and exhibits good adhesion and isopropyl alcohol rub resistance. The composition comprises an organic solvent, a flexible thermoplastic polyurethane resin, a dye, a cellulose nitrate resin, and an adhesion promoter.

The present invention also provides a method of forming printed images on the glass, plastic, and metal surfaces using the ink composition of the instant invention. In accordance with the present invention, the method comprises projecting a stream of droplets of the ink composition onto the surface of a substrate, such as glass, plastic and metal, and controlling the direction of the stream electronically so that the droplets form the desired printed image on the surface.

The foregoing and other objects and advantages of the present invention, as well as additional inventive features, will be apparent from the description of the preferred embodiments of the invention provided herein.

DETAILED DESCRIPTION OF THE PREFERRED EMBODIMENTS

The jet ink composition of the instant invention comprises an organic solvent, a dye, a polyurethane binder, a cellulose nitrate resin, and an adhesion promoter.

General Properties

In general, the ink compositions of the present invention exhibit the following characteristics for use in ink jet printing systems: (1) a viscosity from about 1.6 to about 7.0 centipoises at 25° C.; (2) an electrical resistivity from about 50 to about 2000 ohm-cm; and (3) a sonic velocity from about 1100 to about 1300 meters/second.

Solvents

Organic solvents suitable for the ink composition of the instant invention include ketones such as acetone, methyl ethyl ketone, diethyl ketone, cyclohexanone, and the like, esters such ethyl acetate, propyl acetate, butyl acetate, amylacetate, and the like, alcohols such methanol, ethanol, n-propanol, isopropanol, n-butanol, i-butanol, t-butanol, n-pentanol, n-hexanol, and the like, hydrocarbon solvents such as hexane, cyclohexane, heptane, benzene, toluene, xylene, and the like, glycols such as ethylene glycol, propylene glycol, glycerin, diethylene glycol, and the like, glycol ethers such as ethylene glycol dimethyl ether, ethylene glycol diethylether, cellosolve, diethylene glycol dimethylether, diethylene glycol diethylether, and the like, and other solvents commonly known to one of ordinary skilled in the art. Methyl ethyl ketone is a preferred solvent. If desired, a mixture of solvents may be used. For example, a small amount of ethanol may be added to methyl ethyl ketone solvent.

FILMCOL™ Special Industrial Solvent C-2 from Shell Chemical Co. which is 200 proof modified specially denatured alcohol (5% methanol) is a preferred solvent.

Polyurethanes

Flexible thermoplastic polyurethane resins are used as binders in the preparation of the ink compositions of the instant invention. Flexible thermoplastic urethanes are produced by the reaction of polyols and diisocyanates. Examples of polyols include ethylene glycol, propylene glycol, propanediol, butanediol, polyethylene glycol, polypropylene glycol, polyethylene glycol adipate diol, polyethylene glycol succinate diol, polytetrahydrofuran diol, and the like. Examples of diisocyanates include 2,4-tolylene diisocyanate, 2,6-tolylene diisocyanate, 4,4'-diphenylmethane diisocyanate, hexamethylene diisocyanate, and the like.

Polyurethanes having molecular weight in the range of about 5,000 to about 50,000 are preferred and polyurethanes having molecular weight in the range of about 20,000 to about 24,000 are even more preferred.

Examples of preferred urethane polymers that are useful in the present invention include, but are not limited to, the flexible thermoplastic polyurethane solutions sold under the commercial name of SURKOPAK™ by Kane International Corp., Rye, N.Y. A variety of grades of polyurethanes are sold under this name and include ,SURKOPAK 2135, SURKOPAK 5299, SURKOPAK 5244, SURKOPAK 5255, SURKOPAK 2X, SURKOPAK 5322, SURKOPAK 5311, and SURKOPAK XL. They are normally used to modify nitrocellulose based printing inks for flexo and gravure applications on flexible packaging substrates such as polyethylene, polypropylene, polyester, and cellulose. The physical properties of the polyurethane solutions are presented in Table 1 below.

TABLE 1

| | Properties of the Surkopak Polyurethane Resins | | | | | | | |
|---|---|---|---|---|---|---|---|---|
| Grade | 2135 | 5299 | 5244* | 5255 | 2X | 5322** | 5311 | XL |
| Solids % | 80–85 | 80–85 | 73–78 | 73–78 | 65–70 | 68–73 | 63–68 | 68–73 |
| Viscosity | 15–25 | 25–30 | 12–16 | 25–30 | 40–50 | 6–8 | 30–40 | 15–20 |
| Solvent | A | A | E | E | E | E/A | E | E/A |
| Flash Point, °C. | 12 | 12 | –4 | –4 | –4 | –4 | –4 | –4 |

A = Alcohol; E = Ester; E/A = Mixture of E and A
*Weight Average Molecular Weight Range 18,000–22,000
**Weight Average Molecular Weight Range 7,000–9,000

These polyurethanes are non-reactive and are essentially free of isocyanate groups. Among these preferred polyurethane solutions, even more preferred is SURKOPAK 5244, SURKOPAK 5244 is sold as a solution in ethyl acetate.

The concentration of the polyurethane resin (active ingredient) in the ink composition is in the range of about 1 percent to about 12 percent by weight, preferably in the range of about 1 percent to about 6 percent by weight, and more preferably in the range of about 2 percent to about 5 percent by weight. If the polyurethane is commercially sold as a solution, as in the case of Surkopak, the amount of the polyurethane solution to be used to prepare the ink is calculated from the concentration of the polyurethane in the solution.

Colorants

The ink composition comprises a colorant which is a dye that imparts the desired color to the printed message. Any dye that may be dissolved in the ink composition may be used in the instant invention. For instance, U.S. Pat. No. 5,254,158, and UK Patent Application GB 2,105,735 list several examples of dyes. All of these dyes and pigments may be used in the instant invention. Examples of dyes applicable to the present invention include, but are not limited to, the yellow dyes such as C.I. Solvent Yellow 19 (C.I. 13900A), C.I. Solvent Yellow 21 (C.I. 18690), C.I. Solvent Yellow 61, C.I. Solvent Yellow 80, FD&C Yellow #5, Yellow Shade 16948, Acid Yellow 23, Levaderm Lemon Yellow (Mobay), Spirit Fast Yellow 3G, Aizen Spilon Yellow C-GNH (Hodagaya Chemical Co.), Pergasol Yellow CGP (Ciba-Geigy), and the like, the orange dyes such as C.I. Solvent Orange 1 (C.I. 11920), C.I. Orange 37, C.I. Orange 40, Diaresin Orange K (Mitsubishi Chemical Industries, Ltd.), Diaresin Orange G (Mitsubishi Chemical Industries, Ltd.), Sumiplast Orange 3G (Sumitomo Chemical Co., Ltd.), and the like, red dyes such as C.I. Solvent Red 8, C.I. Solvent Red 81, C.I. Solvent Red 82, C.I. Solvent Red 84, C.I. Solvent Red 100, Cibacron Brilliant Red 38-A (Aldrich Chemical Co.), Drimarene Brilliant Red E-6A (Pylam, Inc.), Acid Red 92, Reactive red 31 (ICI America), and the like, pink dyes such as Diaresin Pink M (Mitsubishi Chemical Industries, Ltd.), Sumiplast Pink RFF (Sumitomo Chemical Co.), Direct Brill Pink B Ground Crude (Crompton & Knowles), and the like, violet dyes such as C.I. Solvent Violet 8, C.I. Solvent Violet 21, Diaresin Violet (Mitsubishi), Diaresin Violet D, Sumiplast Violet RR (Sumitomo), and the like, blue dyes such as C.I. Solvent Blue 2, C.I. Solvent Blue 11, C.I. Solvent Blue 25, C.I. Solvent Blue 36, C.I. Solvent Blue 55, and the like, green dyes such as C.I. Solvent Green 3 and the like, brown dyes such as C.I. Solvent Brown 3 and Diaresin Brown A (Mitsubishi), and the like, black dyes such as Valifast Black 3810 (Orient), C.I. Solvent Black 3, C.I. Solvent Black 5, C.I. Solvent Black 7, C.I. Solvent Black 22, C.I. Solvent Black 27, C.I. Solvent Black 29, Acid Black 123, and the like. A preferred colorant is Valifast Black 3810.

The colorant is present in the ink composition in an amount required to produce the desired contrast and readability. The colorant is preferably present in the range of about 2 percent to about 12 percent by weight, more preferably in the range of about 3 percent to about 9 percent by weight, and even more preferably in the range of about 4 percent to about 6 percent by weight.

Surfactants

The jet ink composition may preferably contain a surfactant, which may be anionic, cationic, nonionic, or amphoteric. Examples of anionic surfactants are, but are not limited to, alkylbenzene sulfonates such as dodecylbenzene sulfonate, alkylnaphthyl sulfonates such as butyl or nonyl naphthyl sulfonate, dialkyl sulfosuccinates such as diamyl sulfosuccinate, alcohol sulfates such as sodium lauryl sulfate, and perfluorinated carboxylic acids such as perfluorodecanoic acid and perfluorododecanoic acid. Nonionic surfactants include the alkylesters of polyethylene glycol, fatty acid esters of glycerol, fatty acid esters of glycol, and the like, and fluorochemical surfactants such as FC 430, FC 431, FC 740, FC 120, FC 248, FC 352, FC 396, FC 807, and FC 824, which are available from 3M Co. Cationic surfactants include alkylamines, amine oxides, amine ethoxylates, alkyl hydroxyalkyl imidazolines, quaternary ammonium salts, and amphoteric surfactants include the alkylbetaines, the amidopropylbetaines, and the like. The surfactant FC 430, which is a mixture of fluoroaliphatic polymeric acrylate esters, is a preferred surfactant.

The solid surfactant made into solution may be present in the jet ink composition in the range of about 0.01 percent to about 0.2 percent by weight, preferably in the range of about 0.01 percent to about 0.1 percent by weight, and more preferably in the range of about 0.01 percent to about 0.05 percent by weight.

Other Resins

The jet ink composition may contain an additional resin to improve the ahesion and solvent resistance. These resins include cellulose based resins. Examples of cellulose based resins are cellulose acetate, cellulose propionate, cellulose butyrate, cellulose acetate-butyrate, ethyl cellulose, hydroxypropyl cellulose, and cellulose nitrate. A preferred cellulose based resin is cellulose nitrate.

Cellulose nitrate is the reaction product of cellulose with nitric acid. Various grades of cellulose nitrate are characterized by the degree of substitution by nitro groups of the hydroxyl groups of cellulose. Cellulose nitrates which are useful in the present invention include any of a wide variety of cellulose nitrates including those which are commercially available. Useful cellulose nitrates include the RS, AS, and SS type cellulose nitrates wetted by isopropyl alcohol, ethanol or water sold by Hercules, Inc. The RS type cellulose nitrate has a nominal degree of substitution which corresponds to a nitrogen content of about 12%. The viscosity of a particular cellulose nitrate solution is related to its degree of polymerization. Cellulose nitrate resins of many different degree of polymerization are available under the RS type. The preferred cellulose nitrate is the one with the viscosity of 15 centipoises (for about 12.2% solution).

The resin may be present in the jet ink composition in the range of about 1 percent to about 10 percent by weight, preferably in the range of about 2 percent to about 8 percent by weight, and more preferably in the range of about 3 percent to about 5 percent by weight.

Plasticizers

The jet ink composition may preferably contain a plasticizer. The type of plasticizer selected should be compatible with the additional resin selected for inclusion in the composition. For cellulose nitrate resin, examples of plasticizers that are compatible and useful are adipic acid derivatives such as diisobutyl adipate, di-n-hexyl adipate, and the like, azelaic acid derivatives such as bis(2-ethyl hexyl)azelate, benzoic acid derivatives such as diethyleneglycol dibenzoate, citric acid derivatives such as tri-n-butyl citrate, epoxy derivatives such as epoxidized soybean oil, bisphenol A diglycidylether, glycol derivatives such as diethyleneglycol dipelargonate, glycolates such as methyl phthalyl ethyl glycolate, hydrocarbons such as hydrogenated terphenyls, isophthalic acid esters such as di-2-ethylhexyl isophthalate, oleic acid derivatives such as butyl oleate, phosphoric acid derivatives such as tributyl phosphate, tri-2-ethylhexyl phosphate, and the like, phosphonic acid derivatives such as chlorinated polyphosphonate (Phosgard C-22-R), phthalic acid derivatives such as dimethyl phthalate, dibutyl phthalate, and the like, adipic acid polyesters such as Paraplex G-40 (mol. wt. 6,000), Santicizer 334F (mol. wt. 2,000), and the like, ricinoleic acid derivatives such as methyl ricinoleate, stearic acid derivatives such as n-butyl stearate, sulfonic acid derivatives such as (o,p)-toluenesulfonamide, N-ethyl-(o,p)-toluenesulfonamide, toluenesulfonamide-formaldehyde resin (SANTOLITE™ MHP), and the like, tartaric acid derivatives such as dibutyl tartrate, terephthalic acid derivatives such as bis(2-ethylhexyl) terephthalate, and trimellitic acid derivatives such as tris(2-ethylhexyl)trimellitate. Other examples of plasticizers that will be compatible with cellulose nitrate can be found, e.g., in *Kirk-Othmer —Encyclopedia of Chemical Technology*, vol. 18, p. 111–183, 3rd edition (John-Wiley & Sons). A preferred plasticizer for use in the instant invention is Santicizer 8, which is an o,p-mixture of N-ethyl-toluenesulfonamide, available from Monsanto Co.

The plasticizer may be present in the jet ink composition in the range of about 0.1 percent to about 3 percent by weight, preferably in the range of about 0.1 percent to about 2 percent by weight, and more preferably in the range of about 0.5 percent to about 1.5 percent by weight.

Adhesion Promoters

The jet ink composition may preferably contain an adhesion promoter to improve the adhesion of the jet ink to the substrate. Examples of the classes of adhesion promoters that may be useful are transition metal organates such as titanium organates, zirconium organates, hafnium organates, and the like. Preferred organates are the titanium organates sold by DuPont Chemical Co. under the tradename of TYZOR titanates. Examples of TYZOR titanates include TYZOR TBT, which is titanium tetra-n-butoxide, TYZOR TPT, which is titanium tri-isopropoxide, TYZOR GBA, which is titanium diisopropoxide bis(2,4-pentanedionate), TYZOR LA, which is titanium ammoniumlactate, and TYZOR AA, which is titanium acetylacetonate. A preferred TYZOR titanate for use in the instant invention is TYZOR GBA. Some of the titanates are sold as solution in a suitable solvent.

The titanate (the active ingredient) may be present in the jet ink composition in the range of about 0.1 percent to about 5 percent by weight, preferably in the range of about 0.5 percent to about 3 percent by weight, and more preferably in the range of about 1 percent to about 2 percent by weight.

Other Additives

The jet ink composition may contain in addition additives for adjusting the viscosity, electrical resistivity, and the speed of evaporation. The preferred range of viscosity is about 1.5 centipoise to about 6.0 centipoise. The preferred resistivity is about 500 ohm-cm to about 1500 ohm-cm.

The compositions of the present invention may contain conductivity agents. If present, they usually are present in amounts of from about 0.0 percent to about 2.0 percent. Examples of suitable conductivity agents include dimethylamine hydrochloride, diethylamine hydrochloride, lithium nitrate, and hydroxylamine hydrochloride. Sufficient conductivity is offered by the dye, Valifast Black 3810, in the presence of the solvent used in the ink. Humectants may be used in the formulations. Humectants include glycerin, ethylene glycol, and the like. Various, known viscosity modifying agents may be added, as needed, to adjust the viscosity of any given ink formulation.

The jet ink formulation may be prepared by any known methods. In one method, all the desired ingredients are combined in a mixer or a mixing vessel and mixed sequentially until a homogeneous solution is obtained.

The jet ink composition may be generally jet printed onto the surface of a wet glass, plastic, and metal article such as a glass bottle, plastic bottle, or aluminum container. The jet ink of the instant invention may be jet applied onto a variety of glasses, including soda-lime glasses, borosilicate glasses, alumino-silicate glasses, lead glasses, borate glasses, and the like. The above specified types of glass may contain a coating.

The jet ink composition may be jet applied onto plastic bottles or containers. The bottle or container may be made by any kind of plastic. Examples of plastics include polyethylene, polypropylene, PVC, nylons, polyesters such as PET, polycarbonate, polyacetals, polyacrylates, polyurethanes, polyethers, polystyrene, polyimides, and the like. If necessary, these plastic containers may be pretreated, for example, by oxidation, corona treatment, plasma treatment, and the like, to prepare the surface for jet printing.

The jet ink composition may also be applied on metal containers. Any metal container may be jet printed using the jet ink of the instant invention. Examples of metal containers include containers made of aluminum, steel, tin, copper, and the like. Certain containers may need to be pretreated, such as sandblasting, acid cleaning, and the like, to prepare the surface for jet printing.

All percentages expressed herein are percentages by weight, based on the total weight of the ink composition of the present invention, unless otherwise indicated.

The following example further illustrates the present invention but, of course, should not be construed as in any way limiting its scope.

| Ingredient | Percent by weight |
|---|---|
| Methyl ethyl ketone (Harcos) | 61.2 |
| FILMCOL (Shell) | 20.0 |
| Nitrocellulose, RS type, 15 cps (Hercules) | 6.0 |
| SURKOPAK Polyurethane 5244 | 5.0 |
| SANTICIZER (Monsanto) | 1.0 |
| TYZOR GBA (DuPont) | 1.5 |
| Valifast Black Dye 3810 (Orient) | 5.0 |
| FC 430 10% in MEK (3M Co.) | 0.3 |
| | 100.0 |

The above ink formulation was prepared and tested on a variety of metal cans. Printer runnability testing was also carried out. The jet ink performed satisfactorily. The drying time was also satisfactory. The printed images had isopropyl alcohol rub resistance. The images were capable of resisting at least 20 medium force rubs from an isopropyl alcohol soaked cotton swab.

Images can be printed on glass, plastic, and metal surfaces using the jet ink composition of the instant invention by projecting a stream of droplets of the ink to the surface and controlling the direction of the stream electronically so that the droplets form the desired printed image on the surface.

All of the references, including patents, patent applications, and publications, cited herein are hereby incorporated in their entireties by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. A method of forming images having good adhesion and isopropyl alcohol rub resistance on glass, plastic, and metal surfaces using a jet ink composition comprising an organic solvent, a flexible thermoplastic polyurethane resin, a dye. a cellulose nitrate resin, and an adhesion promoter, said method comprising projecting a stream of droplets of said jet ink composition to said surface and controlling the direction of said stream electronically so that said droplets form the desired printed image on said surface.

2. The method of claim 1, wherein said jet ink composition has (1) a viscosity of from about 1.6 to about 7.0 centipoises at 25° C.; (2) an electrical resistivity of from about 50 to about 2000 ohm-cm; and (3) a sonic velocity of from about 1100 to about 1300 meters/second.

3. The method of claim 2, wherein said solvent comprises methyl ethyl ketone.

4. The method of claim 3, wherein said solvent further comprises ethanol.

5. The method of claim 2, wherein said polyurethane resin comprises polypropylene glycol and 4,4'-diphenylmethane diisocyanate.

6. The method of claim 5, wherein said polyurethane resin has a weight average molecular weight in the range of 18,000 to 22,000.

7. The method of claim 6, wherein said polyurethane resin is present in the concentration range of from about 2 percent to about 12 percent by weight of said jet ink composition.

8. The method of claim 7, wherein said polyurethane resin is present in the concentration range of from about 4 percent to about 6 percent by weight of said jet ink composition.

9. The method of claim 7, wherein said dye is C.I. Solvent Black 29.

10. The method of claim 9, wherein said dye is present in an amount of from about 3 to about 7 percent by weight of said jet ink composition.

11. The method of claim 10, wherein said jet ink composition further comprises a surfactant.

12. The method of claim 11, wherein said surfactant is a nonionic fluoroaliphatic polymeric acrylate ester and is present in an amount of from about 0.01 to about 0.2 percent by weight of said jet ink composition.

13. The method of claim 12, wherein said jet ink composition further comprises a plasticizer.

14. The method of claim 13, wherein said plasticizer is N-ethyl (o,p)-toluenesulfonamide.

15. The method of claim 14, wherein said plasticizer is present in an amount of from about 0.1 percent to about 3 percent by weight of said jet ink composition.

16. The method of claim 1, wherein said adhesion promoter is a titanium organate.

17. The method of claim 16, wherein said titanium organate is selected from the group consisting of titanium tetra-n-butoxide, titanium triisopropoxide, titanium diisopropoxide bis(2,4-pentanedionate), titanium ammoniumlactate, and titanium acetylacetonate.

18. The method of claim 17, wherein said organate is present in an amount of from about 0.1 percent to about 5 percent by weight of said jet ink composition.

19. The method of claim 1, wherein said solvent is selected from the group consisting of ketones, esters, alcohols, hydrocarbons, glycols, and combinations thereof.

20. The method of claim 1, wherein said cellulose nitrate resin has a nitrogen content of about 12 percent.

* * * * *